United States Patent [19]

Franz

[11] 4,420,033
[45] Dec. 13, 1983

[54] SYSTEM FOR AUTOMATICALLY CONTROLLING VEHICLE COMPARTMENT TEMPERATURE AND TRANSDUCER THEREFOR

[75] Inventor: Rudolph J. Franz, Schaumberg, Ill.

[73] Assignee: Eaton Corporation, Cleveland, Ohio

[21] Appl. No.: 190,290

[22] Filed: Sep. 24, 1980

[51] Int. Cl.$^3$ .................. F25B 29/00; B60H 3/00
[52] U.S. Cl. .................................. 165/26; 165/43; 236/87; 62/323.4
[58] Field of Search ............ 236/87, 13, 91 F, 91 D, 236/1 EB; 165/2, 26, 43, 42, 23, 27, 65; 62/323.4

[56] References Cited

U.S. PATENT DOCUMENTS

| | | | |
|---|---|---|---|
| 3,315,730 | 4/1967 | Weaver et al. | 165/23 |
| 3,606,764 | 9/1971 | Yokouchi et al. | 62/213 |
| 3,774,676 | 11/1973 | Franz | 165/23 |
| 3,861,588 | 1/1975 | Bata et al. | 236/13 |
| 3,983,930 | 10/1976 | Franz | 165/31 |
| 4,134,542 | 1/1979 | Sugiura | 236/87 |
| 4,143,706 | 3/1979 | Schraibel et al. | 165/26 |
| 4,270,362 | 2/1981 | Lancia et al. | 62/173 |

OTHER PUBLICATIONS

Pontiac Service Manual, 1977 A and G Series C65 Service Procedures, pp. 1C-5 and 1C-6.

Primary Examiner—Albert J. Makay
Assistant Examiner—Harry B. Tanner
Attorney, Agent, or Firm—C. H. Grace; R. A. Johnston

[57] ABSTRACT

An automatic temperature control system for regulating the temperature of a vehicle passenger compartment at an operator selected temperature. The system employs an in-car transducer which senses compartment air temperature and emits a vacuum control signal to a vacuum operated servoactuator. When ambient temperatures require heating, the servoactuator is operative to shut off the cooling refrigerant compressor and modulate the opening of the heater core water valve for controlling the temperature of forced air discharge from the heater core. When ambient temperatures require cooling, the servoactuator closes the heater core water valve and intermittently opens and closes a switch for cycling the refrigerant compressor to modulate the temperature of forced air discharge over the refrigerant heat exchanger. The transducer receives blower discharge air for aspirating in-car for temperature sensing. A minor portion of the blower discharge is diverted to impinge on the temperature sensor for sensing condensate freezing on the refrigerant heat exchanger.

18 Claims, 10 Drawing Figures

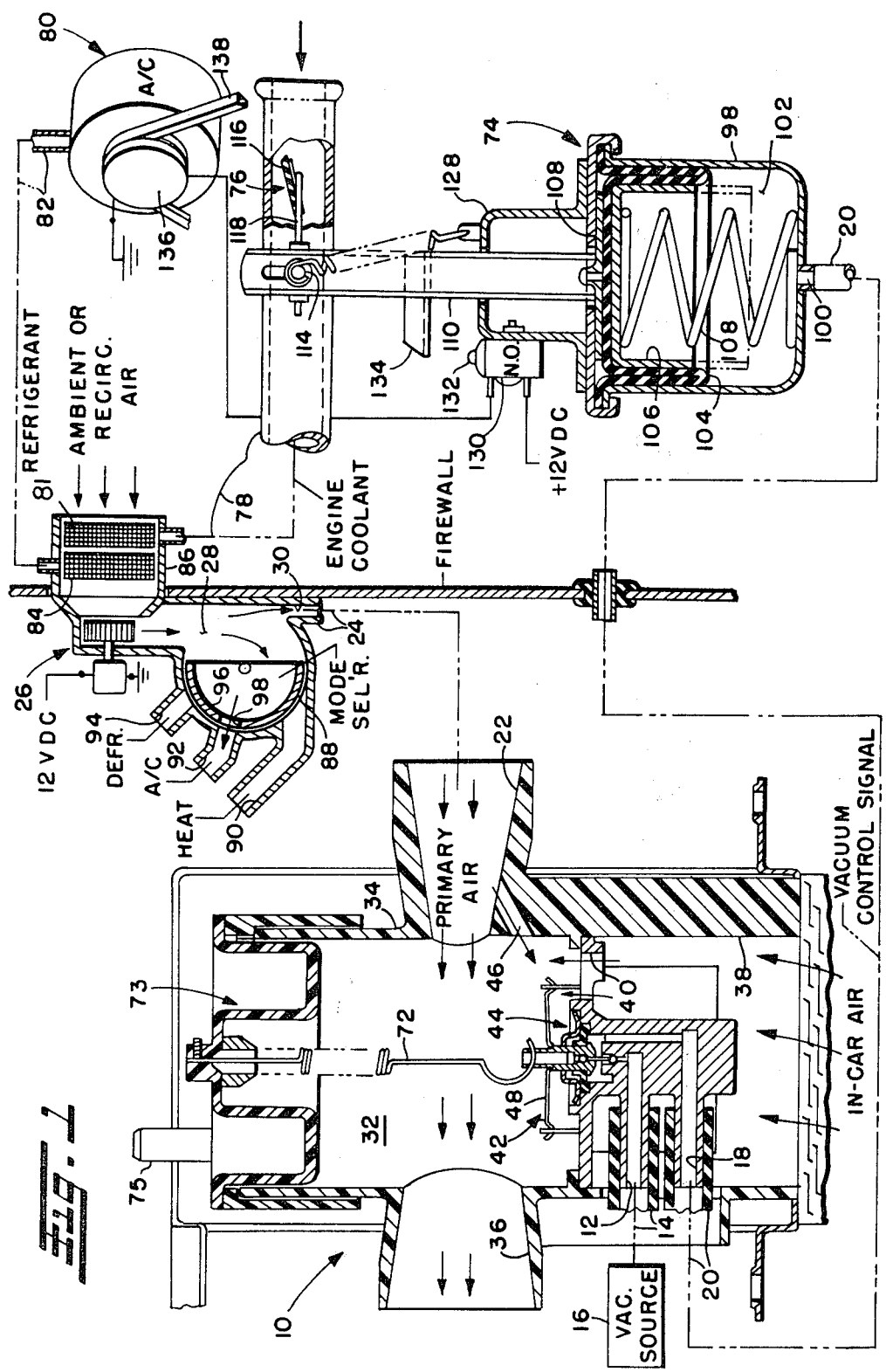

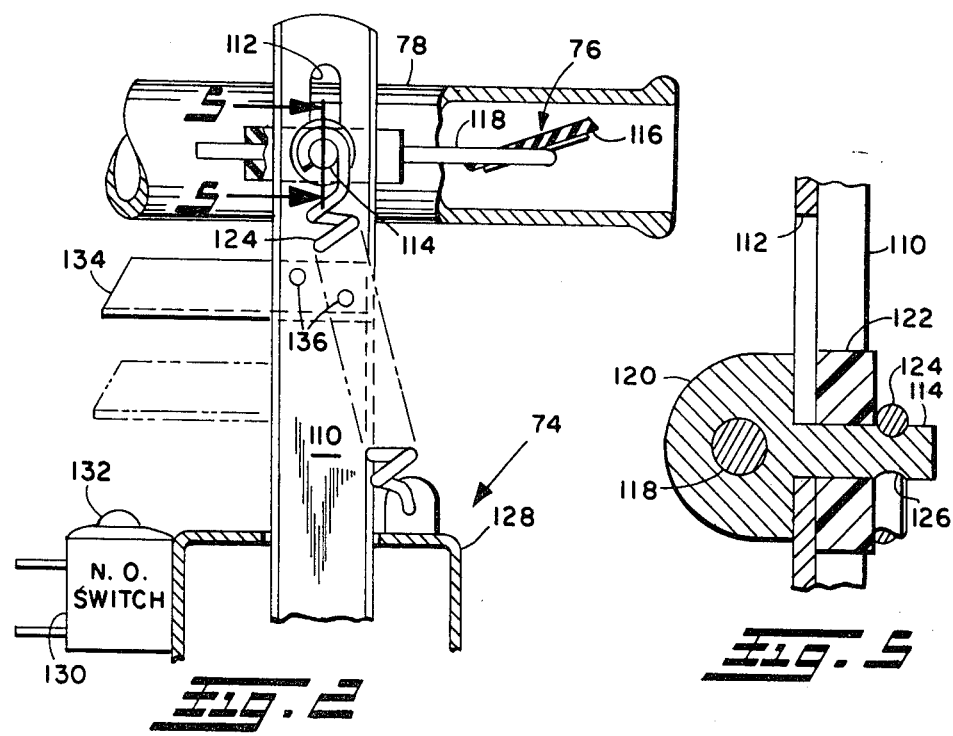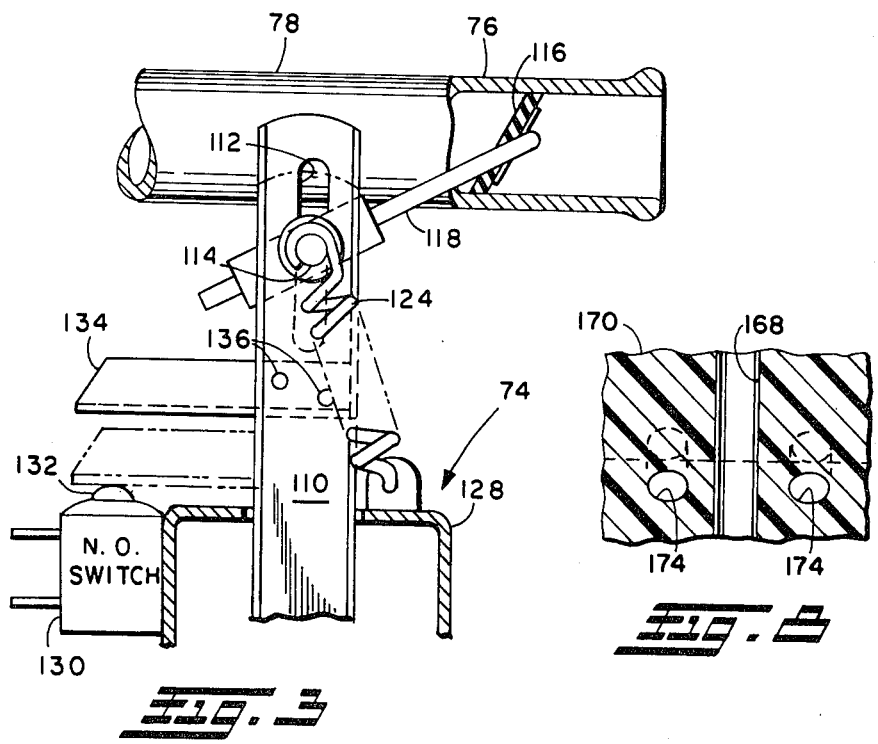

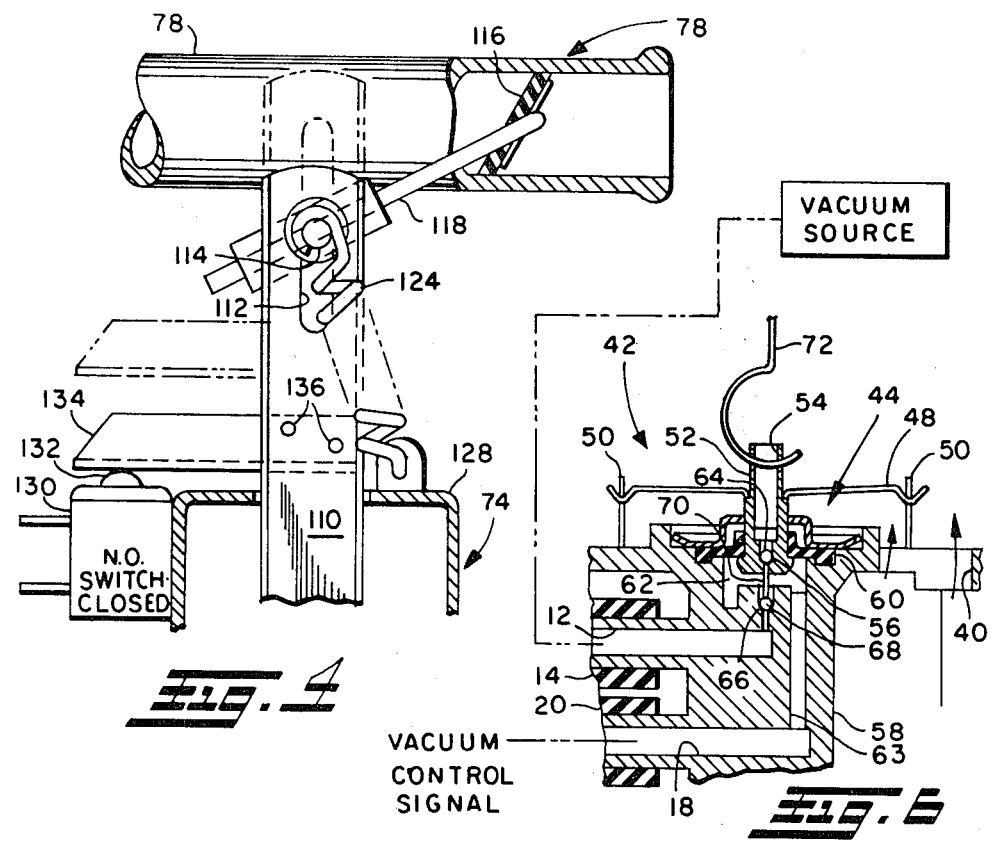
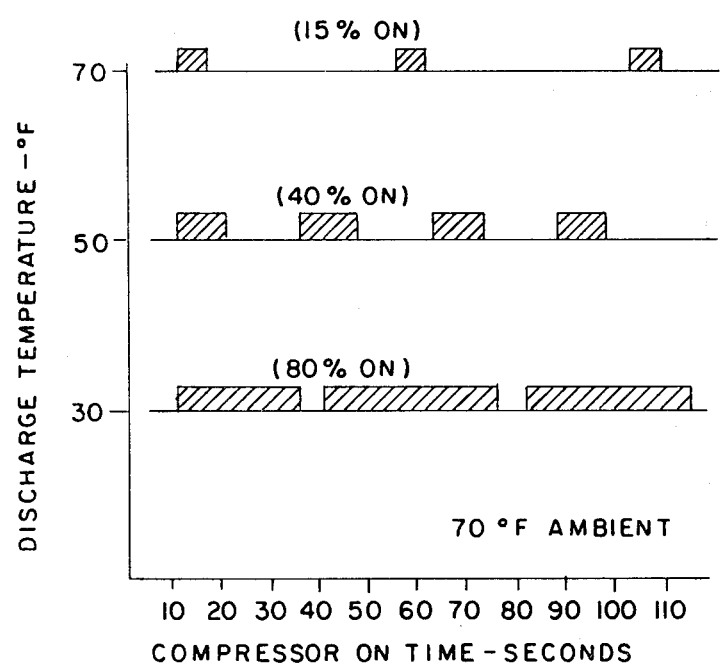

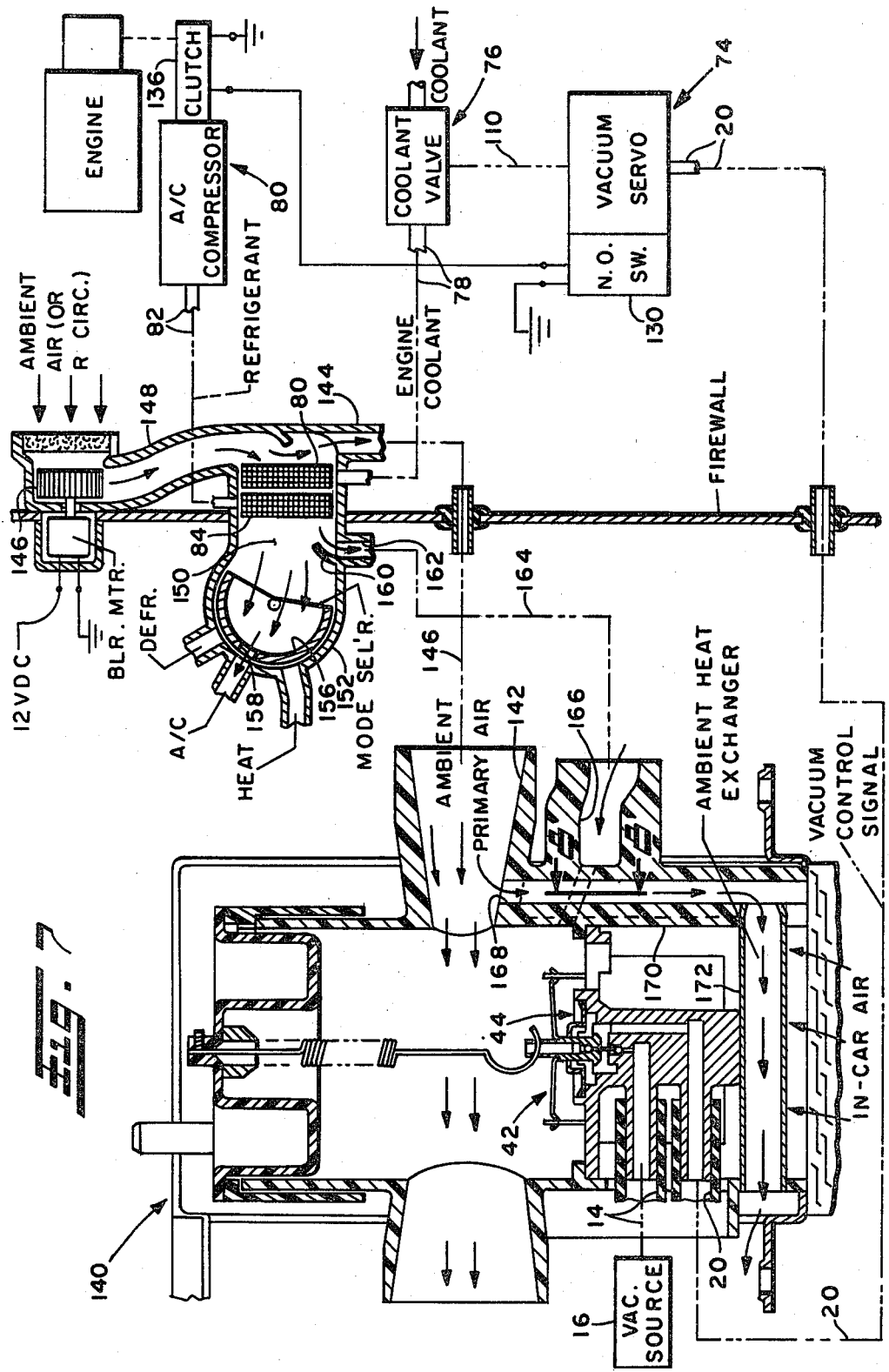

SYSTEM FOR AUTOMATICALLY CONTROLLING VEHICLE COMPARTMENT TEMPERATURE AND TRANSDUCER THEREFOR

BACKGROUND OF THE INVENTION

The present invention relates to systems for controlling the temperature in vehicle passenger compartments and is particularly related to vehicles having a pump or compressor generating a source of refrigerant for circulating to means for cooling the passenger compartment during warm weather. This invention also relates to such systems operating with heating means receiving engine coolant for providing heat to the passenger compartment during cold climate operation.

In providing climatic comfort systems for automotive vehicles, it is commonplace to provide an operator activated manual cooling or air conditioning system for warm weather operation and a separate operator actuated heating system for cold weather operation. In such manual systems, the operator selects a level of system operation and heated or cooled air is discharged from a blower plenum into the passenger compartment. However, for increased occupant comfort and operator convenience, automatic temperature control systems have been provided wherein the operator selects a desired temperature and the system blends a mixture of air blown over the heating means and cooling means and discharges blended air from the plenum to regulate the temperature of the passenger compartment. Such known automatic systems have employed a sensor responsive to the passenger compartment temperature to provide a fluid pressure control signal for determining the position of a blend air door for proportioning the amount of air from the blower directed to the heating and cooling means. Examples of such systems are those described and shown in U.S. Pat. Nos. 3,774,676, 3,983,930 and copending application Ser. No. 50,022 filed June 18, 1979, entitled "Vehicle Temperature Control System", in the name of R. J. Franz, assigned to the Assignee of the present invention.

The known automatic vehicle passenger compartment or cabin temperature control systems provide for continuously circulating engine coolant through the heating means and operating the refrigerant compressor and proportioning air flow from the blower to the heating means and cooling means for obtaining the desired temperature of blended air for discharge to the passenger compartment. Thus, the known automatic vehicle cabin air temperature control systems require that the valve controlling flow of engine coolant to the heating means be operated in the open position continuously, even when the control system requires only cooling of ambient air for occupant comfort. Heretofore, the cooling-only mode in automatic temperature control systems has been accomplished by positioning a blend air door to divert all blower air over the cooling means. Known automatic temperature control system, when operated in the heating only mode, blend cooled air blown over the cooling means with heated air from the heating means in order to obtain the desired temperature of heated air for discharge. The prior art systems thus continued operation of the engine driven compressor for circulating refrigerant to the cooling means even when the system was being operated in the heat only mode.

Consequently, the known automatic vehicle temperature control systems have required the engine to provide the additional power for operating the refrigerant compressor when only heating of the vehicle cabin was desired, with a resultant increase in the fuel consumption of the vehicle engine. At a time when the cost of engine fuel was a minor portion of the operating cost of the vehicle, the increased fuel consumption was considered unimportant in view of the comfort, convenience and desirability of an automatic system for regulating the passenger compartment temperature at a preselected set point. However, where the cost of engine fuel is a major consideration in the operation of the vehicle, it has been desired to provide an automatic temperature control system for the passenger compartment which minimizes the power drain from the engine, thus permitting more of the engine output to be utilized for vehicle propulsion. It has thus been long desired to provide a system which automatically regulates the vehicle passenger compartment temperature in a most efficient manner and yet provides sufficient sensitivity as to respond adequately to variations in the passenger compartment temperature due to ambient temperature variations, number of passengers carried, and solar heat loads.

Heretofore, all automotive air conditioning systems including both the manual type and automatic temperature control systems have employed a pressure sensor in the refrigerant line to the cooling means to sense freezing of moisture condensate on the cooling means. Ice buildup on the cooling means tends to block blower air flow over the cooling means and thus renders the system unable to cool the passenger compartment.

Previous attempts to prevent energy waste in automatic vehicle passenger compartment temperature regulation have employed the techniques of varying the bias on the refrigerant pressure sensing switch to produce on and off cycling of the refrigerant compressor in response to and variations of the pressure in the refrigerant line to the cooling means. An example of this type of a system is that described in the aforementioned commonly assigned application, Ser. No. 050,022. However, the aforesaid system, although providing an in-car temperature sensor to control cycling of the refrigerant compressor, nevertheless required that the engine coolant valve to the heating means be open when the system was operated in the cooling only mode, since the primary control of cabin air temperature was accomplished by positioning a blend air door for mixing air blown over the cooling means and the heating means. Thus the aforesaid prior art system required expenditure of energy to provide refrigerant air cooling and then reheating of the cooled air for temperature regulation.

Therefore, it has long been desired to provide an automatic system for regulating vehicle passenger compartment temperature, yet provide such a system which does not require the operation of the refrigerant compressor, even on a modulated duty cycle basis, during cold climate vehicle operation when the temperature control system is operated in the heat-only mode. It has also been desired to provide a simplified automatic temperature control system for vehicle passenger compartments in which freezing of condensed moisture on the cooling means could be prevented by control sensitivity during normal operation. Further, it has been desired to provide such a system having control of moisture condensation freezing on the cooling means in a manner which does not require separate sensors and complete cut-out of the refrigerant compressor for prolonged periods.

SUMMARY OF THE INVENTION

The present invention provides an automatic control system for regulating the temperature in a vehicle passenger compartment to a tempeature selected by the operator. The novel system provides cooling by means of circulating refrigerant from an engine powered pump or compressor through a heat exchanger when only cooling of the passenger compartment is required. The present invention automatically provides for heating of the passenger compartment to the preselected temperature during cold climate operation by circulating engine coolant through a heat exchanger or heater and during such operation disconnects the refrigerant compressor from the engine power source. During cold climate operation the automatic temperature control system of the present invention maintains passenger compartment temperature by modulating the position of the engine coolant valve. The system provides a fluid pressure control signal responsive to variations in passenger compartment temperature to a servoactuator for modulating the position of a valve for controlling flow of engine coolant to a heat exchanger. Forced air is blown over the heat exchanger and discharged to the passenger compartment.

When cooling is required, the refrigerant compressor is cycled to control the temperature of refrigerant to a cooling heat exchanger where forced air is blown over the refrigerant heat exchanger or evaporator and discharged to the passenger compartment. The heating and cooling heat exchangers are preferably fluidically in series with the air blower. A portion of the forced or primary air from the heat exchangers is fed back to the passenger compartment transducer's sensor for biasing the fluid pressure control signal modulator valve associated with the sensing furnction. The transducer's sensor and fluid pressure signal modulator valve are operative to respond to variations in the temperature of the primary air to effect the value of the fluid pressure control signal.

The system of the present invention provides a fluid pressure control signal operated servoactuator, which, in response to the control signal at ambient temperatures above a predetermined value, closes the coolant valve for preventing coolant flow to the heat exchanger and at temperatures at and below a predetermined temperature cuts out the refrigerant compressors to prevent cooling of the passenger compartment. The servoactuator of the present invention is preferably vacuum operated and employs a pressure responsive means which, in response to a vacuum control signal representative of temperatures above a predetermined level, moves to a position closing the coolant valve to the heat exchanger; and, in response to subsequent variations in the passenger compartment temperature provides cycling of the compressor by intermittent actuation of a switch for controlling the compressor clutch.

At ambient temperatures at and below the predetermined value, the vacuum servoactuator prevents actuation of the compressor clutch switch and responsive to subsequent variations in the vacuum control signal, modulates the position of the coolant valve to control flow to the heat exchanger for regulating the temperature of the passenger compartment. The primary air in the system of the present invention is blown over the engine coolant heat exchanger and the refrigerant heat exchanger fluidically in series to the plenum and a minor portion of the plenum discharge air is fed back to the passenger compartment temperature sensor. This feedback of a portion of the primary blower air to the sensor, enables the sensor-modulator valve to sense freeze-up of condensation on the refrigerant heat exchanger and emit a control signal producing cut-out of the compressor in a manner which eliminates the need for a refrigerant pressure switch.

The present invention thus provides an automatic control system for regulating the temperature of vehicle vehicle passenger compartment at a preselected level. The system of the present invention utilizes a temperature transducer which generates a fluid pressure control signal for operating a servoactuator to either modulate the position of the engine coolant valve for circulating coolant to the heater or provides or intermittent on-off cycling of the compressor to vary the temperature of the refrigerant circulated to the cooling heat exchanger. The system provides a means for forcing ambient or recirculated air over the heater and refrigerant heat exchanger for providing tempered air for discharge to the passenger compartment. A portion of the tempered air is fed back to the transducer's sensor for providing sufficient sensitivity to monitor freezing of condensation on the refrigerant heat exchanger and altering of the fluid pressure control signal for cutting out the refrigerant compressor. The system of the present invention thus provides an automatic temperature control system for a vehicle passenger compartment which automatically regulates temperature at a preselected value without requiring operation of the refrigeration compressor at times when heating of the ambient air is required to maintain the desired compartment temperature. During periods of warm climate vehicle operation when cooling of ambient air is required for maintaining the desired compartment temperature, the system provides for intermittent duty cycle operation of the compressor, for controlling the temperature of the refrigerant and thus minmizes energy needed for compressor operation.

BRIEF DESCRIPTION OF THE DRAWINGS

FIG. 1 is a somewhat pictorial schematic of the system showing the electrical and fluidic interconnection of the various components;

FIG. 2 is an enlarged view of the servoactuator-engine coolant valve interconnection showing the coolant valve in the full open position;

FIG. 3 is a view similar to FIG. 2 showing the coolant valve closed and the compressor switch unactuated;

FIG. 4 is a view similar to FIG. 2 showing the coolant valve closed with the pressure actuator in the over travelled position and the normally open switch actuated to the closed position;

FIG. 5 is an enlarged section view taken along section-indicating lines 5—5 of FIG. 2;

FIG. 6 is an enlarged view of a portion of the sensor 10 of FIG. 1;

FIG. 7 is a view similar to FIG. 1 of another embodiment of the invention employing ambient temperature compensation of the sensor;

FIG. 8 is a section view taken along section-indicating lines 8—8 of FIG. 7;

FIG. 9 is a graph of plenum discharge air temperature plotted as a function of refrigerant compressor duty cycle on-time for the control system of the present invention; and, FIG. 10 is a graph of servoactuator vacuum control signal level plotted as a function of ambient temperature for the control system of the present invention.

DETAILED DESCRIPTION

Figure 10:
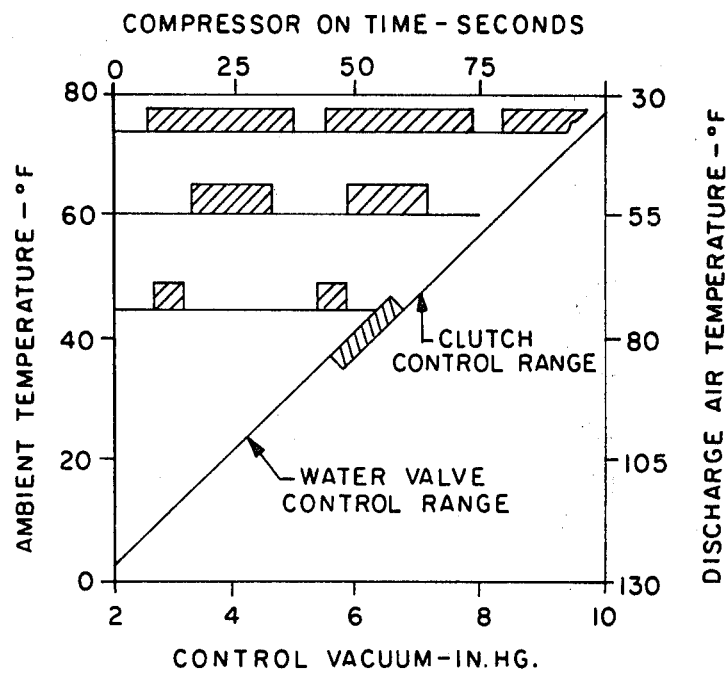

Referring now to FIG. 1 the control system of the present invention is illustrated schematically as having a transducer indicated generally at 10, having a fluid pressure supply port 12 connected by conduit 14 to a source of fluid pressure, as for example, engine manifold vacuum indicated at 16. A fluid pressure signal output port 18 provides a fluid pressure (vacuum) control signal through conduit 20 which passes through the vehicle firewall from the transducer location in passenger compartment of the engine compartment. The transducer 10 has a primary air inlet nozzle 22 receiving, through connecting conduit 24, forced air from the system motor driven blower indicated generally at 26. The blower discharges to a plenum chamber 28 which has a discharge port 30 which is connected to conduit 24.

Primary air flows through transducer inlet nozzle 22 through central mixing chambers 32 within housing 34 of the transducer and outwardly through outlet nozzle 36. As primary air is forced through the mixing chamber 32 and exits through nozzle 36 of the transducer, in-car air is aspirated through inlet passage 38 in the lower portion of the transducer 10 and the aspirated air travels vertically upward through passage 38 through a plurality of bypass channels, one of which is shown at 40, and into the mixing chamber 32 and is there mixed with the incoming primary air from nozzle 22 and the mixed air is exhausted through the outlet nozzle 36.

Transducer 10 has a temperature responsive means or sensor indicated generally at 42 disposed within chamber 32 and a vacuum modulator valve assembly indicated generally at 44. The vacuum modulator valve assembly 44 is operative to control the vacuum output control signal through conduit 20 as will be hereinafter described.

The primary air inlet nozzle 22 has a bleed or diverter passage 46 provided therein, which passage is operative to divert a portion of the primary air to impinge directly on the temperature sensing means 42. In the presently preferred practice of the invention, the diverter passage 46 has been found to function satisfactorily with an effective flow area of approximately 60% of that of the throat of primary area inlet nozzle 22. In one particularly satisfactory embodiment of the present invention, the primary area inlet nozzle 22 has a throat diameter of 0.312 inches (7.9 mm) and the diverter passage 46 has a diameter of 0.187 inches (4.8 mm).

Referring now to FIGS. 1 and 6, the temperature sensing means 42 and modulator valve 44 are shown in detail wherein the sensing means 42 includes a by bimetal member 48 mounted between a pair of spaced upright stanchions 50 and has connected centrally therethrough valve seat member 52 which has a passage 54 for admitting atmospheric air therethrough. A valve seat 56 is provided at the lower end of the passage 54. An annular pressure responsive diaphragm 60 is sealed about its inner periphery in the valve body 58 and about its inner periphery to the outer periphery valve seat member 52.

The diaphragm 60 forms the upper wall of a vacuum chamber 62 formed in the valve body 58 and which communicates with signal output port 18 formed in the valve body through vertical passage 63. A second valve seat 66 is formed in the body 58 and communicates with chamber 62 and vacuum source port 12.

A movable valve member 64 is movably received in the valve seat surface 56 and a second valve member 68 movably contacts the lower valve seat 66. The upper and lower valve members 64, 68 are interconnected by a rod 70 for simultaneous movement. The valve seat member 52 is biased in an upward direction by connection to the lower end of tension spring 72.

The position of the valve members 64 and 66 with respect to their individual valve seats 56, 66 is determined by the forces acting on valve member 52 which comprise the force of bias spring 72, force applied by bimetal temperature sensor 48 and the pressure differential acting across diaphragm 60. Bias spring 72 is preloaded by a rotary cam means indicated generally at 73 which receives an operator input at connecting crank pin 75. The operator input varies the preload on spring 72 for providing the desired cabin temperature input to the system.

The operation of the modular valve assembly 44 is that of a pressure-forced balance device well known in the art and the operation of which is described in co-pending application Ser. No. 897,604 filed Apr. 18, 1978 in the name of R. J. Franz entitled Temperature Regulated Assembly and Signal Modulator Therefor, commonly assigned. The description of the modulator valve assembly in the just mentioned application is deemed sufficiently thorough and is incorporated herein by references and further description is omitted for the sake of brevity.

Referring now to FIG. 1, the operation of the transducer 10, as heretofore described, produces a vacuum control signal from modulator valve 42 which is applied through conduit 20 passing through the engine compartment firewall to a vacuum servoactuator indicated generally at 74.

The vacuum servoactuator is operatively connected to an engine coolant valving mechanism indicated generally at 76 which supplies heated engine coolant through a conduit 78 to a heating means in the form of a heat exchanger or heater core 81. The cooling valve assembly receives engine coolant from the engine water pump (not shown) which is circulated to heater core 81 via conduit 78 and return to the pump through a return line (not shown).

An engine driven refrigerant compressor indicated generally at 80 provides a flow of pressurized refrigerant through conduit 82 to a cooling heat exchanger or evaporator 84 and the refrigerant is returned to the compressor through a return line (not shown). The heater core 80 and evaporator 84 are in the presently preferred practice of the invention fluidically in series in a housing or duct assembly 86, portions of which extend through the firewall to form a housing for blower assembly 26.

The blower assembly draws in ambient air which passes over the the heater core and evaporator 81, 84 and is discharged into the plenum chamber 28 which is forced by an extension 88 of the blower housing 86. The plenum has three spaced discharge outlets 90, 92, 94 providing respectively blended air for heating, cooling and defrost mode functions.

A mode selector valve 96 is rotatably mounted within the plenum 28 and has a discharge opening 98 provided therein for directing discharge. Rotation of the mode selector valve 96 aligns the discharge opening 98 with one of the outlet passages 90, 92, 94 to provide the desired mode function. The mode selector valve 98 is operated by suitable connections to operator actuated controls the details of which have been omitted for clarity and which are well known in the art. As described above, the plenum outlet port 30, which supplies plenum primary air to the sensor 10, is connected to the chamber 28. In the presently preferred practice, the outlet port 30 is formed intergrally with the plenum housing portion 88.

It will be understood to those having ordinary skill in the art that the air inlet to duct 86 may receive either ambient air or air drawn from the passenger compartment via a recirculation duct connected through the firewall (not shown) for recirculation of passenger compartment air for rapid cooling or heating upon initial vehicle start up. Such recirculation technique is well known in the art and has been omitted herein for the sake of brevity.

Referring now to FIGS. 1 through 5, inclusive, the vacuum servoactuator mechanism 74 includes a housing means or container 98 having a signal inlet port 100 connected to control signal conduit 20 such that the housing 98 forms therewithin a vacuum chamber 102. A pressure responsive diaphragm 104, having a backing cup 106 is biased upwardly by spring 108, is received in the chamber 102 and sealed about the periphery thereof to form the upper wall of chamber 102. The central portion of diaphragm 104 is sandwiched between the cup 106 and an exterior backing plate 108 and secured therebetween by suitable expedients, as for example riveting. The backing plate 108 has rigidly attached thereto an output actuator member in the form of channel member 110 which extends vertically therefrom.

In operation, as the control signal applied through port 100 increases the vacuum in chamber 102, diaphragm and backing plate 108 move downwardly from the upward limit position against the underside of the top of housing 98 as shown in solid outline in FIG. 1. The upper edge of channel 110 has a vertically oriented longitudinal slot 112 provided therein which slot has received therein a lug 114 which is operatively connected to the coolant valve mechanism 76.

The valve mechanism 76 includes a butterfly valve member 116 rotatably received within the conduit 78 and having attached thereto a crank arm 118 which extends outwardly through the wall of conduit 78 and is operatively attached to lug 114 received in the actuator slot 112.

Referring to FIG. 5, the lug 114 is shown being formed as a part of slider 120 which registers against the rear, or leftward, face of channel 110 in FIG. 5, and has which slidably received therein crank arm 118. The lug 114 is retained in slot 112 by retaining washer 122 and the upper end of tension spring 124 which is received in a groove 126 formed in the lug 114 and has its lower end connected to mounting bracket 128 attached to the top of the servo housing 98. The tension spring 124 biases the lug downwardly for registration against the bottom of slot 112 and is shown in this position in FIG. 5.

Referring now to FIG. 2, the actuator channel 110 is shown in its vertically upper limit of travel, with the diaphragm plate 108 (See FIG. 1) registering against the top of the housing 98, wherein the crank arm 118 is rotated to the horizontal position of FIG. 2 positioning butterfly 116 in the fully open position.

Referring now to FIG. 3, the actuator channel 110 is shown moved vertically downward, upon the application of control signal vacuum through chamber 102 (See FIG. 1) and the diaphragm cup 106 is moved to the position shown in dashed outline in FIG. 1. With actuator channel 110 in the position shown in solid outline in FIG. 3, the butterfly valve 116 is in the fully closed position and lug 114 is registered against the bottom of slot 112 under the urging of tension spring 124.

A normally-open (N.O.) electrical switch 130 is mounted on the side of mounting bracket 128 such that the actuator 132 extends to be actuated in the direction of travel of the actuator channel 110 and vertically with respect to the drawings. A switch contact arm 134 is attached to the actuator channel 110 by suitable fastening, means such as rivets 136, and extends horizontally therefrom an amount sufficient to permit contact of switch actuator 132 by the under surface thereof.

With reference to FIGS. 2 and 3, the actuator arm 134 is positioned on actuator channel 110 such that when the lug 114, and consequently crank arm 118, are responsive to movement of actuator channel slot 112, for moving the butterfly valve 116, the arm 134 is spaced above switch actuator 132 and makes no contact therewith with the range of movement shown by the solid outline positions of the arm in FIGS. 2 and 3. Thus, when a control signal is applied to the actuator 74 for modulating the water valve for regulating heat supply to the passenger compartment, the actuator channel 110 modulates position of the butterfly valve 116 and does not provide actuation of the switch 130.

Referring now to FIGS. 1 and 4, the switch 130 has one terminal connected to a suitable source of electrical power, such as an onboard vehicle 12 volt DC supply, and the other terminal connected to one side of an electrically actuated clutch 136 such that switch 130 is electrically in series with the clutch. Upon movement of the switch actuator 132, the normally open switch 130 closes to energize or actuate clutch 136 for engaging the compressor 80 with the engine power in a suitable manner, as, for example, through a compressor shaft pulley driven by a belt 138.

With reference particularly to FIG. 4, the actuator channel 110 is shown in an "over-travelled" position wherein the vacuum control signal has caused the servoactuator diaphragm to move downward sufficiently to pull the bottom of slot 112 downwardly away from lug 114, to be positioned as shown in solid outline in FIG. 4. It will be apparent with reference to FIG. 4 that the butterfly valve 116, having been fully closed, does not permit further rotational movement of crank arm 118 thus causing the lug 114 to remain stationary and not follow further downward movement of slot 112.

With the actuator channel 110 in the position shown in solid outline in FIG. 4, the switch arm 134 is in a position to contact switch actuator 132 and close the switch 130 for energizing clutch 136 (FIG. 1) for powering the refrigerant compressor. With the actuator channel 110 in the position shown in FIG. 4, small variations in the control signals will cause diaphragm 104 (FIG. 1) to move in response thereto by small amounts thus alternately actuating and deactuating switch 130 for cycling the refrigerant compressor on and off.

Thus in operation, when the sensor 42 of transducer 10 senses a cabin air temperature substantially greater than the operator selected temperature, the modulator valve assembly 44 emits a vacuum control signal to the actuator 74 resulting in movement of the output actuator channel 110 to the position shown in FIG. 4. The control signal is thereafter modulated so as to cause movement of the arm 134 to cycle the compressor clutch on and off.

The control system of the present invention, as mentioned here and above, eliminates the need for providing a refrigerant pressure sensing switch to cut off the compressor 80 in the event of a condensate freezing and ice build up on the evaporator 84. This is accomplished in the present invention by feedback of the primary air to the bimetal temperature sensor 42 via diverter channel 46 provided in the sensor inlet nozzle 22. The primary air diverted through channel 46 provides an override of the sensing of the in-car air aspirated through the bottom of the transducer and causes the temperature sensor 42 to react to the cold air through channel 46. The modulator valve 44 then emits a vacuum control signal causing the arm 134 to open the switch 130 shutting off the compressor. The transducer of the present invention thus provides a unique sensor modulator providing feedback of the temperature of the evaporator core by simultaneously sensing in-car temperature and primary air from the evaporator, thereby providing a unique and novel control capability for automatic temperature control systems for automotive vehicle passenger compartments.

Referring now to FIG. 7, another embodiment of the control system is illustrated which employs a novel transducer indicated generally at 140 having provision therein for ambient temperature compensation and which requires modification of the system plumbing from the arrangement shown in FIG. 1 as will be described below.

The system of FIG. 7 functions in basically the same manner as the system of FIG. 1 and employs the same compressor 80, clutch 136, coolant valve 76, compressor switch 130, vacuum servoactuator 74, actuator channel member 110, heater core 80 and evaporator 84 as the system of FIG. 1. The FIG. 7 system employs the same conduit 20 for identical hook up to the vacuum control signal port of the transducer 140. The transducer 140 employs the same vacuum modulator valve 44 and temperature transducer 42 as the transducer 10 of FIG. 1.

However, the transducer 140 has the inlet nozzle 142 thereof receiving ambient primary air via conduit 146 and blower discharge outlet 144 provided upstream of the heater core 81 and evaporator 84. In this an arrangement blower 146 draws in raw ambient air, or recirculated air, and discharges same through a duct 148 which directs the air over the heater core 81 and evaporator 84 and into the mixing plenum 150.

The plenum housing 152 is connected through the firewall to the duct work 148 which houses the evaporator 84 and heater core 81. Duct 148 includes a vane 154 directing the major portion of the blower discharge over the heater core 81 and evaporator 84. However, a minor portion of the blower discharge exits through duct outlet 144 and flows through conduit 146 into transducer inlet nozzle 142.

The primary air flowing into plenum 150 is directed via mode selector valve 156, rotatably mounted within the plenum, through outlet 158 to the selected Heat, A/C or Defrost outlet provided in the plenum. The operation of the mode selector valve 156 is similar to that of the valve 96 of the FIG. 1 embodiment.

Plenum 150 includes a deflector vane 160 which deflects a minor portion of the plenum air through discharge outlet 162 and via conduit 164 to a separate inlet manifold 166 provided in the transducer 140.

Transducer 140 has a bleed passage 168 formed in the primary air inlet nozzle 142, which passage 168 communicates vertically downwardly through the wall of the transducer body 170 and communicates with the interior of an ambient heat exchange tube 172 extending transversely across the aspirator inlet of sensor 140. In the presently preferred practice of the invention, the tube 172 is formed of a suitable heat conducting metal as for example brass; however, other suitable materials may be employed.

It has been found satisfactory in the present practice of the invention to size the ambient compensation passage 168 to have a diameter of 0.125 inches (3.2 mm), for a throat diameter of 0.312 inches (7.8 mm) for nozzle 142, since only a small portion of the primary air is required for ambient compensation.

Referring now to FIGS. 7 and 8, the plenum discharge inlet manifold 166 is formed in the wall of transducer housing 170 and includes a pair of space passages 174 disposed on opposite sides of ambient compensation passage 168. The inlet passages 174 extends through the wall 170 of the transducer housing inclined upwardly such that plenum discharge air flowing from conduit 164 flows through passages 174 and impinges on the bimetal temperature sensor 42.

The air flowing through passages 174 performs the same function as the diverted primary air flowing through passage 46 in the sensor 10 of FIG. 1. The function of transducer 140 is otherwise identical to that of transducer 10 of the FIG. 1 embodiment and further description herein is deemed unnecessary.

The control system of FIG. 7 thus employs a novel transducer having ambient temperature compensation, which transducer functions to provide a vacuum control signal to the servoactuator 74 for modulating the coolant valve 76 in the same manner as the system of FIG. 1. When cooling of the passenger compartment is called for the transducer 140 of the FIG. 7 embodiment controls vacuum servoactuator 74 so as to actuate the normally open switch 130 to control operation of the refrigerant compressor clutch 136 in the same manner as the transducer 10 functions in the FIG. 1 embodiment. Thus the FIG. 7 control system provides the same overall system function as the FIG. 1 embodiment but employs ambient temperature compensation to the sensor for increased system sensitivity and greater accuracy of temperature control.

Referring now to FIG. 9, the control sensitivity and responses of the transducer 10, 140 and servoactuator 74 are chosen, by techniques well known to those skilled in the art, to preferably provide a cooling mode compressor duty cycle program as shown.

Referring now to FIG. 10, the mode function programs of the presently preferred system are shown as related to ambient temperature and vacuum control signal level.

The control system of the present invention enables the temperature of the passenger compartment to be regulated during the heating mode by modulating the position of the coolant water valve supplying coolant to the heater core. During the cooling mode of operation, the control system of the present invention cycles the compressor clutch to control the temperature of the refrigerant circulated to the evaporator and thus eliminates the need for the pressure switch to cut out compressor clutch when condensate freezing occurs on the evaporator core. The control system of the present invention automatically determines whether heating mode or cooling mode operation is required and provides either mode of operation without overlap thereby minimizing energy consumption for compressor operation substantially.

Although the invention has been described herein with reference to the preferred practice, it will be apparent to those having ordinary skill in the art that modifications and variations of the invention may be made and the invention is limited only by the following claims:

I claim:

1. A system for controlling the temperature in a vehicle passenger compartment comprising:
    (a) compressor means operable upon connection to an on-board source of power for providing a source of refrigerant;
    (b) clutch means operable upon activation and de-activation to drivingly connect and disconnect said compressor means with said source of power;
    (c) cooler means disposed in heat-exchange relationship with said refrigerant and including means operable to provide heat exchange between said refrigerant and said compartment;
    (d) heater means receiving an on-board source of heated fluid in heat exchange relationship therewith, said heater means being operable to provide heat exchange between said heated fluid and said compartment;
    (e) heater valve means operable to control flow of heated engine coolant to said heater means;
    (f) duct means having said heater means and said cooler means received therein and operable upon receiving a flow of forced air therethrough to direct substantially all of said flow over first one of said heater means and said cooler means and then over the other for providing tempered air;
    (g) blower means operable to direct a flow of forced air to said duct means upstream of said heater means and said cooler means;
    (h) plenum means receiving said tempered air from said duct means downstream of said heater means and said cooler means and operable to direct said tempered air to said compartment;
    (i) sensing tap means operative to divert a minor portion of said duct flow upstream of said heater means and said cooler means;
    (j) fluid flow powered transducer means operable upon receiving flow from said sensing tap means to sense the temperature of the atmosphere in the vehicle passenger compartment and, upon connection to a source of fluid pressure, provide a modulated fluid pressure signal indicative of variations in the sensed temperature;
    (k) fluid pressure responsive means including a movable actuator member operable in response to certain characteristics of said fluid pressure signal to modulated said coolant valve between no flow and maximum flow and including switch means operable to actuate and de-actuate said clutch means in response to predetermined amount of movement of said actuator member; and,
    (l) selector means operative upon actuation by the vehicle operator to provide a desired temperature input to said transducer means wherein, upon the operator actuating said selector means, said transducer provides a variable fluid pressure signal such that said fluid pressure responsive means regulates said coolant valve and cycles said compressor for maintaining the passenger compartment at said desired temperature.

2. A system for controlling the temperature of a vehicle compartment comprising:
    (a) compressor means operable upon connection to an on-board source of power for providing a source of refrigerant;
    (b) clutch means operable upon energization and de-energization to drivingly connect and disconnect said compressor to the source of power;
    (c) heater valve means operable to receive flow from an on-board source of heated fluid including a valve member movable to control flow fluid;
    (d) heater means disposed in heat exchange relationship with said heated fluid and operable to provide heat exchange between said fluid and the vehicle compartment atmosphere;
    (e) cooler means receiving said refrigerant and operable to provide heat exchange between said refrigerant and said compartment atmosphere;
    (f) duct means including blower means for forcing a flow of air over one of said heater means and said cooler means and then substantially all of said air over the other for providing tempered air, said duct means operative to direct said tempered air to said passenger compartment,
    (g) fluid flow powered transducer means operable upon receiving a minor portion of said duct flow to sense vehicle compartment temperature and operable upon connection to a source of fluid pressure to provide a modulated fluid pressure signal indicative of variations in the sensed compartment temperature;
    (h) single fluid pressure responsive means operable upon said transducer means sensing temperatures below a predetermined level to modulate the position of said heater valve member in response to said fluid pressure signal, said single pressure responsive means being further operable upon said transducer means sensing ambient temperatures at and above said predetermined level to energize and de-energize said clutch means in response to said fluid signal, said single pressure responsive means including,
        (i) actuator means responsive to said output signal to provide movement of said valve member,
        (ii) switch means connected to said actuator means for making and breaking a circuit in response to certain movement of said actuator means; and,
    (i) circuit means connecting said switch means and said clutch means.

3. A system for controlling the temperature of a vehicle passenger compartment comprising:
    (a) duct means for directing a flow of air;
    (b) blower means operable to force air flow through said duct means;
    (c) plenum means receiving blower discharge air from said duct means and operable to direct same to the passenger compartment;
    (d) fluid flow powered transducer means receiving blower discharge air from said duct means and operative upon connection to an on-board source of fluid pressure to provide a fluid pressure output signal indicative of variations in said compartment temperature, said transducer means including;
        (i) a modulating valve member movable with respect to a valve surface for controlling fluid flow through a passage between a supply port and a fluid signal output port, (ii) pressure responsive means operable in response to the pressure differential between said passage and the atmosphere to control movement of said valve member, (iii) thermally sensitive means operative in response to changes in said compartment temperature to effect a variable bias on said pressure responsive means, wherein said pressure responsive means seeks equilibrium between the forces of said pressure differential acting thereon and said bias for providing modulation of said output signal;

(d) compressor means operative upon connection to an on-board source of power to provide a source of refrigerant;

(e) clutch means operative upon actuation and de-actuation to drivingly connect and disconnect said compressor means to said on-board source of power;

(f) cooling means operatively connected to said compressor means to provide heat exchange between said refrigerant and the said compartment;

(g) heater means operative upon connection to an on-board source of heated fluid to provide heat exchange between said fluid and said vehicle passenger compartment atmosphere, said heater means and said cooling means disposed in said duct means in series relationship such that substantially all of said blower discharge air flows first through one of said said heater means and said cooling means and then substantially all of said air flows through the other of said heater and cooling means;

(h) valve means, including a valve member movable by remote control, operative for controlling flow of said heated fluid to said heater means;

(i) said transducer means further including means operative to sense the temperature of said cooling means and effect a bias on said pressure responsive means for altering said output signal; and (j) single pressure responsive means responsive to said output signal and operative at ambient temperatures below a predetermined level to actuate and deactuate said clutch means, said pressure responsive means including an actuator member operatively connected to provide movement of said movable heater valve member, wherein at and above a predetermined ambient temperature said actuator means is ineffective for opening said heater valve means.

4. A system for controlling the temperature of a vehicle compartment, said system comprising:

(a) fluid pressure powered transducer means operative, upon connection to an on-board source of pressured fluid, to sense the temperature of the atmosphere in said compartment and to provide a fluid pressure output signal indicative of the temperature variations in said compartment;

(b) pump means operative, upon energization from an on-board source of power to provide a source of refrigerant;

(c) clutch means operative, upon actuation and de-actuation to energize and de-energize said pump means from said on-board source of power;

(d) heater valve means connected to an on-board source of heated fluid and including a movable member operative upon movement between an open and closed position to control flow of said heated fluid;

(e) heater means connected to receive said heated fluid from said valve means;

(f) single fluid pressure responsive means including actuator means movable in response to changes in said fluid pressure output signal, said actuator means including an output member operatively connected for causing movement of said heater valve member for controlling flow through said heater valve means, said actuator means including switch means operative for actuating and deactuating said clutch means in response to changes in said fluid pressure output signal wherein said pressure responsive means, in response to said fluid pressure output signal at and above a predetermined level is operative to:

(i) close said heater valve means, and
(ii) actuate said clutch means, below said predetermined level is operative to:
(iii) open said heater valve means and
(iv) deactuate said clutch means;

(g) cooling means operatively connected to said pump means to provide heat exchange with said refrigerant;

(h) blower means operative to provide a stream of primary air substantially all through and in heat exchange relationship with first—one of said heater means and said cooler means and then substantially all of said stream with the other for providing tempered air;

(i) duct means operative to direct the major portion of said tempered primary air from said blower means to the vehicle compartment and including means operative to direct a minor portion of said primary air to said transducer means for powering same;

(j) said transducer includes means aspirating passenger compartment air and sensing the temperature of said air aspirated air and means operative to bias said output signal accordingly; and (k) selector means operable, upon a vehicle operator input, to provide a bias to said modulator means for controlling said compartment temperature at a selected level.

5. The system defined in claim 3, wherein said transducer means includes switch means operative to make and break a circuit and said clutch means includes means operable upon electrical energization and de-energization in response to making and breaking said circuit to actuate and de-actuate said clutch means.

6. The system defined in claim 4, wherein said transducer means includes;

(i) a modulating valve member movable with respect to a valve surface for controlling fluid flow through a passage between a supply port and a fluid signal output port, (ii) pressure responsive means operable in response to the pressure differential between said passage and the atmosphere to control movement of said valve member, (iii) thermally sensitive means operative in response to changes in said compartment temperature to effect a variable bias on said pressure responsive means, wherein said pressure responsive means seeks equilibrium between the forces of said pressure differential acting thereon and said bias for providing modulation of siad output signal.

7. The system defined in claim 4, wherein said pressure responsive means has a lost-motion connection to said valve member wherein overtravel movement of said output member is permitted with said valve member in the closed position and at least one of said clutch means actuation and deactuation occurs during said overtravel movement.

8. The system defined in claim 4, wherein, said pressure responsive means has a lost-motion connection to said valve member, said lost-motion connection including a slot formed in said output member and a follower member received in said slot, wherein, upon movement of said valve member to the closed position, overtravel movement of said output member is permitted.

9. The system defined in claim 4, wherein:
 (i) said pressure responsive means includes switch means operative to actuate and deactuate said clutch means,
 (ii) said output member connection to said valve member includes a lost-motion connection permitting overtravel of said output member when said valve member is in the closed position, and
 (iii) said switch means is actuated with said valve substantially in the closed position.

10. The system defined in claim 4, wherein:
 (i) said pressure responsive means includes switch means operative to actuate and deactuate said clutch means,
 (ii) said output member is connected to said valve member by a lost-motion coupling permitting overtravel movement of said output member while said valve member remains in the closed position, and
 (iii) said switch means is actuated and deactuated during said overtravel movement for cycling said pump means when said valve means is closed.

11. The system defined in claim 4, wherein:
 (a) said transducer means includes a fluid pressure chamber connected to said source and a movable modulator valve member operable to control flow of said pressurized fluid in the chamber;
 (b) said transducer means includes means responsive to the pressure differential between atmosphere and said chamber, said pressure responsive means being operative for controlling movement of said modulator valve member for controlling said fluid pressure output signal; and
 (c) temperature sensitive means, responsive to variations in the temperature of said compartment and said primary fluid to variably bias said pressure responsive means.

12. The system defined in claim 11 wherein said temperature responsive means includes a bimetal element.

13. The system defined in claim 3, wherein said transducer means includes switch means operative to make and break a circuit for actuating and deactuating said clutch means.

14. The system defined in claim 4, wherein said transducer means includes switch means operative to make and break a circuit for controlling said pump means and means operative to prevent said switch from making and circuit upon the occurrence of a predetermined vehicle operating condition.

15. The system defined in claim 4, wherein said on-board source of pressurized fluid is internal combustion engine combustion chamber induction passage pressure and said switch means includes means operative to prevent making said circuit in response to a predetermined level of said induction passage pressure.

16. A system for controlling the temperature in a vehicle passenger compartment, said system comprising:
 (a) pump means operable upon energization from an on-board source of power to provide a flow of refrigerant;
 (b) heater valve means including a member movable between a closed and open position, said valve means being operative upon connection to an on-board source of heated fluid and movement of said member between said open and closed position to control flow of said heated fluid;
 (c) heater means connected to receive flow therethrough of said heated fluid from said valve means;
 (d) cooling means operatively connected to receive flow therethrough of said refrigerant;
 (e) blower means operative upon connection to an on-board source of power to provide a stream of primary air substantially all in series flow and heat exchange relationship with said heater means and said cooling means for providing a flow of tempered air said heater means and said cooling means being disposed on the suction side of said blower means;
 (f) fluid flow powered transducer means including temperature responsive means, said transducer means operative, upon connection to an on-board source of pressurized fluid to sense the temperature in said compartment and to provide a modulated fluid pressure output signal indicative of the temperature variations in said compartment;
 (g) conduit means operative to direct the major portion of said tempered air to the vehicle compartment and including means operative to direct a minor portion of said air flow to said transducer means for powering same;
 (h) single pressure responsive means including actuator means movable in response to changes in said fluid pressure output signal, said actuator means including an output member operatively connected for causing movement of said heater valve member for controlling flow through said heater valve means, said actuator means including switch means operative for energizing and de-energizing said pump means in response to changes in said fluid pressure output signal, wherein said servoactuator means, in response to said fluid pressure output signal at and above a predetermined level is operative to:
  (i) close said heater valve means, and
  (ii) energize said pump means, and for fluid pressure output signals below said predetermined level is operative to
  (iii) open said heater valve means and
  (iv) de-energize said pump means; and,
  (v) selector means operable, upon a vehicle operator input, to provide a bias to said servoactuator means for controlling said compartment temperature at a selected level.

17. A system for controlling the temperature in a vehicle compartment comprising:
 (a) compressor means operable upon connection to an on-board source of power for providing a source of refrigerant;

(b) clutch means operable upon activation and deactivation to drivingly connect and disconnect said compressor means with said source of power;

(c) cooler means disposed in heat exchange relationship with said refrigerant and including means operable to provide heat exchange between said refrigerant and said compartment;

(d) heater means receiving an on-board source of heated fluid in heat exchange relationship therewith, said heater means being operable to provide heat exchange between said heated fluid and said compartment;

(e) heater valve means operable to control flow of heated fluid to said heater means;

(f) duct means adapted for receiving a flow of forced air therethrough with said heater means and said cooler means disposed therein in series relationship such that all of said forced air flows first over one of said cooler means and said heater means and then over the other;

(g) blower means operable to direct a flow of air over said cooler means and said heater means for providing a flow of tempered air;

(h) plenum means operable to direct said flow of tempered air from said duct means to said vehicle compartment;

(i) fluid pressure powdered transducer means receiving a portion of said tempered air from said plenum and operable to sense the temperature of the atmosphere in the vehicle compartment and, upon connection to a source of fluid pressure, provide a modulated fluid pressure signal indicative of variations in sensed temperature;

(j) feedback means operable to divert a portion of said untempered forced air in said duct means upstream of said cooler means and said heater means to said transducer means for influencing said fluid pressure signal;

(k) control means operable upon movement thereof to vary the temperature of said tempered air;

(l) single pressure responsive servoactuator means operable in response to certain characteristics of said fluid pressure signal to move said control means to regulate the temperature of said tempered air; and, (m) selector means operative upon actuations by the vehicle operator to provide a desired temperature input to said transducer means wherein, upon the operator actuating said selector, said transducer provides a variable fluid pressure signal such that said servoactuator moves said control means to regulate the temperature of said tempered air.

18. The system defined in claim 17, wherein said transducer means includes:

(a) a modulating valve member movable with respect to a valve surface for controlling fluid flow through a passage between a suply port and a fluid signal output port;

(b) pressure responsive means operable in response to the pressure differential between said passage and the atmosphere to control movement of said valve member; and (c) thermally sensitive means operative in response to changes in said compartment temperature to effect a variable bias on said pressure responsive means, wherein said pressure responsive means seeks equilibrium between the forces of said pressure differential acting thereon and said bias for providing modulation of said output signal.

* * * * *